(12) United States Patent
Schaeppi et al.

(10) Patent No.: US 12,314,970 B2
(45) Date of Patent: *May 27, 2025

(54) SYSTEMS AND METHODS TO CORRELATE USER BEHAVIOR PATTERNS WITHIN DIGITAL APPLICATION ENVIRONMENTS WITH PSYCHOLOGICAL ATTRIBUTES OF USERS TO DETERMINE ADAPTATIONS TO THE DIGITAL APPLICATION ENVIRONMENTS

(71) Applicant: Solsten, Inc., Edina, MN (US)

(72) Inventors: Joseph Jack Schaeppi, Maple Grove, MN (US); Lynn Danielle Francoise Bergmann, Berlin (DE); Lloyd William West, Berlin (DE)

(73) Assignee: Solsten, Inc., Edina, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/359,797

(22) Filed: Jul. 26, 2023

(65) Prior Publication Data
US 2023/0376984 A1    Nov. 23, 2023

Related U.S. Application Data

(63) Continuation of application No. 17/339,665, filed on Jun. 4, 2021, now Pat. No. 11,727,424.

(51) Int. Cl.
*G06Q 30/02* (2023.01)
*G06Q 30/0204* (2023.01)

(52) U.S. Cl.
CPC ............... *G06Q 30/0204* (2013.01)

(58) Field of Classification Search
CPC .................................. G06Q 30/0204
See application file for complete search history.

(56) References Cited

U.S. PATENT DOCUMENTS 8,000,000 B2    8/2011    Greenberg
8,047,915 B2    11/2011   Lyle
(Continued)

FOREIGN PATENT DOCUMENTS

WO    0106825 A2    2/2001
WO    2021247465    12/2021

OTHER PUBLICATIONS

University of Chicago, Nobel Prize Winner James Heckman, Economics of Personality Traits, J. of Human Resources XLIII p. 972-1059 (Year: 2006).*

(Continued)

*Primary Examiner* — Breffni Baggot
(74) *Attorney, Agent, or Firm* — Esplin & Associates PC

(57) ABSTRACT

Systems and methods to correlate user behavior patterns within digital environments with psychological attributes of users exhibiting the user behavior patterns are disclosed. Exemplary implementations may: store user information associated with the individual users including assignments of the individual users to different clusters of users, wherein the users are assigned to the different clusters based on psychological parameter values; obtain performance information that characterizes performances of user behavior patterns by the individual users; determine correlations between individual ones of the performances of the user behavior patterns and individual ones of the psychological parameters based on the obtained user behavior patterns, the assignments of the users to the clusters, and commonalities in the psychological profiles of the users within the individual clusters; determine adaptations to the digital application environment for the individual users based on the determined correlations; transmit the adaptations to client computing platforms associated with the users for implementation.

12 Claims, 4 Drawing Sheets

(56) References Cited

U.S. PATENT DOCUMENTS

| | | | |
|---|---|---|---|
| 8,086,491 B1 | 12/2011 | Matz | |
| 8,683,348 B1 | 3/2014 | Blank | |
| 9,561,439 B2 | 2/2017 | Oono | |
| 10,075,495 B2 | 9/2018 | Ninoles | |
| 10,332,122 B1 | 6/2019 | Engstrom | |
| 10,384,132 B2 | 8/2019 | Ware | |
| 10,387,173 B1 | 8/2019 | Paulus | |
| 10,678,570 B2 | 6/2020 | Zarlengo | |
| 10,832,154 B2 | 11/2020 | Kashyap | |
| 10,881,964 B1 | 1/2021 | Dills | |
| 10,987,592 B1 | 4/2021 | Schaeppi | |
| 11,206,263 B1 | 12/2021 | Schaeppi | |
| 11,260,174 B2 | 3/2022 | Patel | |
| 2004/0097287 A1* | 5/2004 | Postrel | G07F 17/32 463/41 |
| 2005/0240444 A1 | 10/2005 | Wooten | |
| 2007/0033084 A1 | 2/2007 | Mascarenhas | |
| 2007/0233671 A1 | 10/2007 | Oztekin | |
| 2007/0282912 A1 | 12/2007 | Reiner | |
| 2008/0045317 A1* | 2/2008 | Seelig | G07F 17/3239 463/43 |
| 2008/0081701 A1 | 4/2008 | Shuster | |
| 2008/0126277 A1 | 5/2008 | Williams | |
| 2009/0054123 A1 | 2/2009 | Mityagin | |
| 2009/0076845 A1 | 3/2009 | Bellin | |
| 2010/0022301 A1* | 1/2010 | Carpenter | A63F 13/35 463/43 |
| 2010/0035220 A1 | 2/2010 | Herz | |
| 2010/0083318 A1 | 4/2010 | Weare | |
| 2010/0179950 A1 | 7/2010 | Willcock | |
| 2010/0227302 A1 | 9/2010 | McGilvery | |
| 2011/0035280 A1 | 2/2011 | Fordyce, III | |
| 2012/0015737 A1 | 1/2012 | Craine | |
| 2012/0022944 A1 | 1/2012 | Volpi | |
| 2012/0036448 A1 | 2/2012 | John | |
| 2012/0036449 A1 | 2/2012 | Minnis | |
| 2012/0054040 A1 | 3/2012 | Bagherjeiran | |
| 2012/0124062 A1 | 5/2012 | Macbeth | |
| 2012/0142429 A1* | 6/2012 | Muller | A63F 13/69 463/42 |
| 2012/0317064 A1 | 12/2012 | Hagiwara | |
| 2013/0041759 A1 | 2/2013 | Mikan | |
| 2013/0111509 A1 | 5/2013 | Guo | |
| 2013/0124628 A1 | 5/2013 | Weerasinghe | |
| 2013/0268394 A1 | 10/2013 | Nikankin | |
| 2013/0304686 A1 | 11/2013 | Antin | |
| 2014/0001205 A1* | 1/2014 | Hodges | B65D 83/0055 222/400.7 |
| 2014/0017648 A1 | 1/2014 | Williams | |
| 2014/0019443 A1 | 1/2014 | Golshan | |
| 2014/0094311 A1* | 4/2014 | Kikuchi | G07F 17/3274 463/40 |
| 2014/0128166 A1* | 5/2014 | Tam | A63F 13/216 463/42 |
| 2014/0156681 A1 | 6/2014 | Lee | |
| 2014/0179408 A1* | 6/2014 | Ducheneaut | A63F 13/63 463/23 |
| 2014/0195303 A1 | 7/2014 | Jarrett | |
| 2014/0278992 A1 | 9/2014 | Roundtree | |
| 2014/0280251 A1 | 9/2014 | Somekh | |
| 2014/0310281 A1 | 10/2014 | Somekh | |
| 2014/0365887 A1 | 12/2014 | Cameron | |
| 2014/0372344 A1 | 12/2014 | Morris | |
| 2015/0094144 A1 | 4/2015 | Brown | |
| 2015/0254995 A1 | 9/2015 | Rosenfeld | |
| 2015/0279227 A1 | 10/2015 | Huber | |
| 2015/0332603 A1 | 11/2015 | Aravkin | |
| 2015/0365449 A1 | 12/2015 | Kurata | |
| 2016/0015307 A1 | 1/2016 | Kothuri | |
| 2016/0067612 A1 | 3/2016 | Ntoulas | |
| 2016/0345060 A1 | 11/2016 | Marci | |
| 2017/0036116 A1* | 2/2017 | Cohen | A63F 9/183 |
| 2017/0111461 A1 | 4/2017 | Kelman | |
| 2017/0149773 A1 | 5/2017 | Kovacs | |
| 2017/0186334 A1 | 6/2017 | Sasidhar | |
| 2017/0251070 A1 | 8/2017 | Liu | |
| 2017/0262164 A1 | 9/2017 | Jain | |
| 2017/0372225 A1 | 12/2017 | Foresti | |
| 2018/0015370 A1* | 1/2018 | Sorek | A63F 13/67 |
| 2018/0101860 A1 | 4/2018 | Fleming | |
| 2018/0137780 A1 | 5/2018 | Toliver | |
| 2018/0189289 A1 | 7/2018 | Wexler | |
| 2018/0213058 A1* | 7/2018 | Loeb | H04L 67/306 |
| 2018/0243656 A1 | 8/2018 | Aghdaie | |
| 2019/0130511 A1 | 5/2019 | Davier | |
| 2019/0253431 A1 | 8/2019 | Atanda | |
| 2020/0051450 A1 | 2/2020 | Yeh | |
| 2020/0065081 A1 | 2/2020 | Lee | |
| 2020/0151278 A1 | 5/2020 | Seida | |
| 2020/0206637 A1 | 7/2020 | Robbins | |
| 2020/0221181 A1 | 7/2020 | Gupta | |
| 2020/0237291 A1 | 7/2020 | Sundaram | |
| 2020/0320335 A1 | 10/2020 | Shamun | |
| 2020/0351537 A1 | 11/2020 | Browy | |
| 2020/0401216 A1 | 12/2020 | Sanger | |
| 2021/0043031 A1 | 2/2021 | Keilwert | |
| 2021/0146258 A1* | 5/2021 | Pedersen | G06N 3/08 |
| 2021/0202045 A1 | 7/2021 | Neumann | |
| 2021/0322887 A1 | 10/2021 | Schaeppi | |
| 2021/0379495 A1 | 12/2021 | Schaeppi | |
| 2022/0019689 A1 | 1/2022 | Lau | |
| 2022/0239653 A1 | 7/2022 | Schaeppi | |
| 2022/0342791 A1 | 10/2022 | Schaeppi | |
| 2022/0391932 A1 | 12/2022 | Schaeppi | |
| 2022/0398340 A1 | 12/2022 | Jakobsson | |
| 2022/0401844 A1 | 12/2022 | Schaeppi | |
| 2023/0120897 A1 | 4/2023 | Kozlowski, III | |
| 2023/0177205 A1 | 6/2023 | Schaeppi | |
| 2023/0245175 A1 | 8/2023 | Schaeppi | |
| 2023/0396846 A1 | 12/2023 | Schaeppi | |
| 2024/0055132 A1 | 2/2024 | Schaeppi | |
| 2024/0062908 A1 | 2/2024 | Schaeppi | |
| 2024/0127311 A1 | 4/2024 | Schaeppi | |

OTHER PUBLICATIONS

Advanced Dungeon Dragons Game Master (Year: 1979).*
App User Segmentation: Best Practices & Examples; Kadir Soner; https://appsamurai.com/app-user-segmentation-best-practices-examples/; Sep. 22, 2016; [retrieved from the internet on Apr. 21, 2020].
Gygax, Gary, "Advanced Dungeons & Dragons, Dungeon Masters Guide: Special Reference Work" ; TSR; 1979; (pp. 1-240).
PCT International Search Report and Written Opinion for Application No. PCT/US2022/025379, mailed Aug. 18, 2022 (9 pages).
PCT International Search Report and Written Opinion for Application No. PCT/US2022/051224, mailed Mar. 1, 2023 (8 pages).
PCT International Search and Written Opinion for Application No. PCT/US2023/011637, mailed Mar. 24, 2023 (9 pages).
PCT International Search Report for Application No. PCT/US2021/035096, mailed Jun. 30, 2021 (6 pages).
PCT International Search Report and Written Opinion for Application No. PCT/US23/76614, mailed Jan. 22, 2024 ( 9 pages).

\* cited by examiner

SYSTEMS AND METHODS TO CORRELATE USER BEHAVIOR PATTERNS WITHIN DIGITAL APPLICATION ENVIRONMENTS WITH PSYCHOLOGICAL ATTRIBUTES OF USERS TO DETERMINE ADAPTATIONS TO THE DIGITAL APPLICATION ENVIRONMENTS

FIELD OF THE DISCLOSURE

The present disclosure relates to systems and methods to correlate user behavior patterns within digital environments with psychological attributes of users exhibiting the user behavior patterns.

BACKGROUND

Typically, users of a digital environment are not "classified" (e.g., into a user type) until after they have begun interacting with the digital environment and have a large enough sample of use for classifications and/or predictions about future activities to be made based on behaviors within the environment. Much less, users are not "classified" for interactions with their own digital application environments (e.g., on their smartphones). Users sometimes have difficulty "finding" beneficial applications, using the beneficial application enough, and/or evading deleterious applications and/or usage thereof. Furthermore, even upon classification based on the behaviors, such classifications may not remain accurate over time. Further, such techniques fail to understand users psychologically as they interact within a digital application environment that may consequently allow the digital application environment to be uniquely adapted to a particular user.

SUMMARY

One aspect of the present disclosure relates to correlating user behavior patterns within digital application environments with psychological attributes of users exhibiting the user behavior patterns. The users of the online game may be organized into different clusters based on psychological profiles of the individual users. Such organization may result in users of similar psychological profiles being assigned to the same clusters. In some cases, determination of the psychological profiles of the individual users may be based on user-provided answers to questions presented to the users that relate to psychological attributes, user behavior patterns, application usage information, and/or other user-provided information within the digital application environment. The user-provided answers, the user behavior patterns, the application usage information, and/or other user-provided information may be used to determine psychological parameter values of the individual users for the psychological attributes. The psychological parameter values of a given user may be included in the psychological profile of the given user. The user behavior patterns performed within the digital application environment by the individual users over a period of time may be obtained. A given user behavior pattern may be correlated with a given psychological parameter based on the performance of the given user behavior pattern (e.g., frequency, total performances, etc.) by users assigned to a clusters in which users strongly present the given psychological parameter. Such correlations may be used to determine adaptations to the digital application environment. The adaptations may be transmitted to a client computing platform for implementation to facilitate usage of beneficial applications, reduced usage of deleterious applications, reduce usage of the digital application environment, increase usage of the digital application environment, and/or other purposes.

One aspect of the present disclosure relates to a system configured to correlate user behavior patterns within digital application environments with psychological attributes of users exhibiting the user behavior patterns. The system may include one or more hardware processors configured by machine-readable instructions and electronic storage. The machine-readable instructions may include one or more instruction components. The instruction components may include one or more of information component, correlation component, utilization component, and/or other instruction components.

The electronic storage may be configured to store information associated with the individual users and/or other information. The information associated with the individual users may include user information. The user information may include assignments of the individual users to individual ones of different clusters of users. The different clusters may be associated with different psychological profiles. A given psychological profile may be defined by multiple psychological parameter values to psychological parameters. The users may be assigned to the different clusters based on the psychological parameter values of the individual users determined based on stated information provided by the users, application usage information, and/or other information. The application usage information may characterize usage of applications within digital application environments by the users. By way of non-limiting example, the user information may include user information for a first user that includes an assignment of the first user to a first cluster based on a first psychological profile of the first user determined based on stated information previously provided by the first user, application usage information for the first user, and/or other information. The psychological profiles of the users assigned to the first cluster may indicate strong presentation of a first psychological parameter.

The information component may be configured to obtain performance information that characterizes performances of user behavior patterns by the individual users within the digital application environments. By way of non-limiting example, the individual performances of user behavior patterns may include a first performance of a first behavior pattern by the first user and other users assigned to the first cluster.

The correlation component may be configured to determine correlations between individual ones of the performances of the user behavior patterns and individual ones of the psychological parameters. Determining the correlations may be based on (i) the obtained user behavior patterns, (ii) the assignments of the users to the clusters, and (iii) commonalities in the psychological profiles of the users within the individual clusters. As a result, by way of non-limiting example, a first correlation may be determined between the first performance of the first behavior pattern and the first psychological parameter. The first correlation may be based on relatively frequent performance of the first performance by the users assigned to the first cluster and the psychological profiles of the users assigned to the first cluster indicating strong presentation of the first psychological parameter.

The utilization component may be configured to determine adaptations to the digital application environment for the individual users. The adaptations may be determined based on the determined correlations. By way of non-limiting illustration, a first adaptation to the digital application environments may be determined for the users of the first cluster, including the first user.

The utilization component may be configured to transmit the adaptations to client computing platforms associated with the users for implementation. By way of non-limiting illustration, the first adaption may be transmitted to the client computing platforms associated with the users of the first cluster.

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
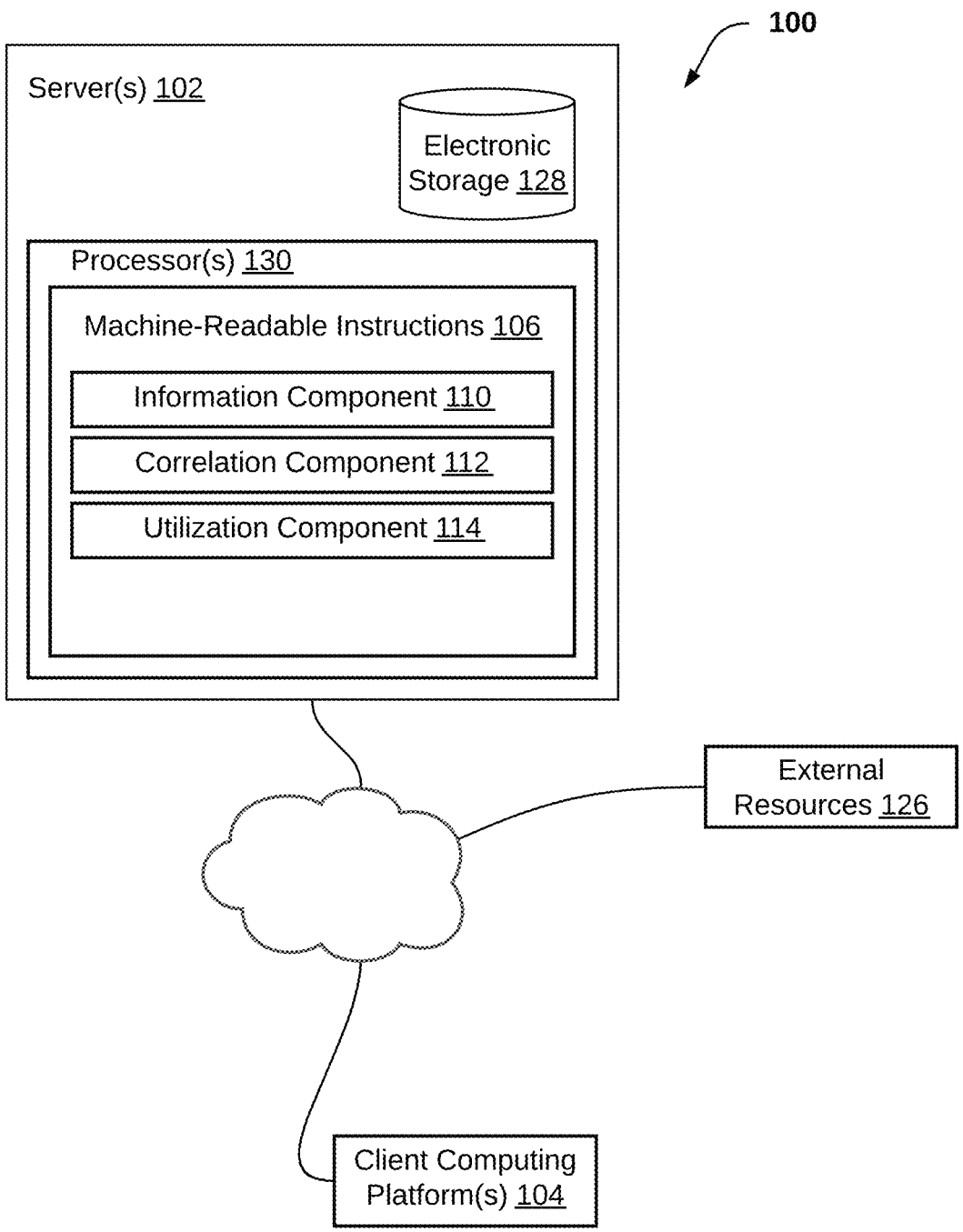
FIG. 1 illustrates a system configured to correlate user behavior patterns within digital application environments with psychological attributes of users exhibiting the user behavior patterns, in accordance with one or more implementations.

FIG. 1 illustrates a system 100 configured to correlate user behavior patterns within digital application environments with psychological attributes of users exhibiting the user behavior patterns, in accordance with one or more implementations. In some implementations, system 100 may include one or more servers 102, storage 128, and/or other components. Server(s) 102 may be configured to communicate with one or more client computing platforms 104 according to a client/server architecture and/or other architectures. Client computing platform(s) 104 may be configured to communicate with other client computing platforms 104 and/or according to a peer-to-peer architecture and/or other architectures.

Client computing platforms 104 may provide the digital application environments. Individual digital application environments may be hosted on different client computing platforms 104 associated with the user. For example, a first digital application environment may be hosted on a smartphone, a second digital application environment may be hosted on a tablet, a third digital application environment may be hosted on a laptop, and so on. In some implementations, the individual digital application environments hosted on different client computing platforms 104 associated with the (same) user may have different collections of applications and usage thereof. In some implementations, the individual digital application environments hosted on different client computing platforms 104 associated with the (same) user may have the same collections of applications and different usage thereof. In some implementations, multiple digital application environments (e.g., the first, second, and third digital application environments) may be associated with a single account of the user. An account associated with the user may be logged into on the various client computing platforms 104 of the user or an association may be established between the account and a given digital application environment of the user. In some implementations, the account may include identifying information of the user including but not limited to values to a name, a username, a birthdate, an age, a gender, residence, payment information (e.g., credit card, gift cards), a managing account (e.g., an account associated with parent), and/or other identifying information.

An instance of the digital application environment may be executed by computer components to determine views (e.g., E-book page, content feed, shopping page, etc.) for individual ones of the applications within the digital application environment and the digital application environment itself. The computer components may be included in server(s) 102, client computing platforms 104, servers associated with the individual applications, or other sources. The views may then be communicated (e.g., via streaming, via object/position data, and/or other information) from server(s) 102 and/or sources to client computing platforms 104 for presentation to users. In some implementations, the view determined and transmitted to a given client computing platform 104 may correspond to a location in a virtual space of a gaming application or fitness application, for example, presented via the digital application environment (e.g., the location from which the view is taken, the location the view depicts, and/or other locations), a zoom ratio, a dimensionality of objects, a point-of-view, and/or view parameters. One or more of the view parameters may be selectable by the user. In some implementations, the views of the digital application environment may comprise icons that correspond to the applications, widgets that correspond to the applications, notifications, and/or other graphical user interface elements that facilitate the user's interaction with client computing platform 104 and the applications.

In some implementations, the instance of the digital application environment may comprise or otherwise present a simulated space that is accessible by users via clients (e.g., client computing platform(s) 104) that present the views of the digital application environment to a user. The simulated space may have a topography, express ongoing real-time interaction by one or more users, include one or more objects positioned within the topography that are capable of locomotion within the topography, a content feed, and/or other simulated objects. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial section of the space. In some instances, the topography may describe a volume with one or more bodies positioned therein (e.g., a simulation of gravity-deprived space with one or more celestial bodies positioned therein). The content feed may include various content presented as the various content is newly available (e.g., by the applications, by other users using the applications, etc.). The instance executed by the computer components may be synchronous, asynchronous, and/or semi-synchronous.

The above description of the manner in which views of the digital application environment and the simulated space are provided is not intended to be limiting. The digital application environment may be expressed in a more limited, or richer, manner. For example, views determined for the digital application environment may be selected from a limited set of graphics depicting an event in a given place within a virtual space or the simulated space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. For example, a view may include video content in conjunction with textual content. Other expressions of individual places within the digital application environment are contemplated.

Within the instance(s) of the digital application environment, users may control or manipulate characters, objects, simulated physical phenomena (e.g., wind, rain, earthquakes, and/or other phenomena), images, videos, documents, and/or other elements within the digital application environment to interact with the digital application environment and/or other users.

The digital application environments may include a plurality of the applications. For example, the applications, and application types thereof, may include game applications, educational applications, reading applications, music applications, social networking applications, entertainment applications, fitness applications, business applications, shopping applications, food & drink applications, among other applications. The applications may be provided by an individual (video) game providers, a gaming console, game companies, website developers, user experience companies, music companies, streaming companies, among others, and/or a combination thereof.

User behavior patterns may include actions performed by the users within the digital application environments. The actions may include one or more of an in-application purchase, an in-application sale, installations of applications, purchases of applications, interactions with users, interactions with content, initiations of particular applications, terminations of the particular applications, and/or other actions. The user behavior patterns may include individual ones of the actions, sets of actions, ordered sets of actions, and/or multiple of the individual actions, the sets of actions, and the ordered set of actions.

Server(s) 102 may be configured by machine-readable instructions 106. Machine-readable instructions 106 may include one or more instruction components. The instruction components may include computer program components. The instruction components may include one or more of game component 108, information component 110, correlation component 112, utilization component 114, and/or other instruction components.

In some implementations, server(s) 102 may include one or more components the same as or similar to game component 108 that may be configured to execute an instance of the online game and/or otherwise perform some or all of the functionality of game component 108.

Electronic storage 128 may be configured to store information associated with the individual users and/or other information. The information associated with the individual users may include user information. The user information may include stated information previously provided by the individual users, psychological profiles for the individual users, assignments of the individual users to individual ones of different clusters of users, and/or other information related to the individual users.

The stated information previously provided by the users may be obtained by a component the same as or similar to information component 110. The stated information may include sets of answers to questions that relate to psychological attributes. The individual sets of answers may be provided by individual ones of the users. In some implementations, the stated information may include the performances of the user behavior patterns. The performances of the user behavior patterns may be executed by the individual ones of the users within one or more various digital application environments. In some implementations, the stated information may include communication information provided by the individual ones of the users within the one or more various digital application environments. The communication information may include textual and/or verbal speech entered and/or spoken, respectively, by the individual users. The sets of answers, the performances of the user behavior patterns, the communication information, and/or other stated information may be transmitted via a network to the one or more processors (e.g., information component 110) to determine sets of psychological parameter values to psychological parameters for the individual users. The sets of answers, the performances of the user behavior patterns, the communication information, and/or other stated information may be indicative, facilitate prediction, and/or facilitate determination of one or more psychological parameter values for the individual users.

The different clusters may be associated with different psychological profiles (of the individual users). A given psychological profile may be defined by multiple psychological parameter values. The psychological parameter values of the individual users may be determined based on the stated information provided by the users, application usage information, and/or other information. In some implementations, the individual users may be associated with a plurality of psychological profiles within other digital application environments. The plurality of the psychological profiles may be aggregated so that an aggregated psychological profile is generated and/or each of the plurality of the psychological profiles may be updated to include psychological parameters values from other ones of the plurality of the psychological profiles. Thus, the psychological profiles for the individual users may be based on correlating the performances of the user behavior patterns by the individual users from various different digital application environments (e.g., the first digital application environment, the second digital application environment) with one or more particular psychological parameter values.

The users may be assigned to the different clusters based on the psychological parameter values of the individual users, the application usage information of the users obtained, and/or other information as described in co-pending U.S. application Ser. No. 17/236,216 entitled "SYSTEMS AND METHODS TO ADAPT A DIGITAL APPLICATION ENVIRONMENT BASED ON PSYCHOLOGICAL ATTRIBUTES OF INDIVIDUAL USERS", the disclosure of which is incorporated by reference in its entirety herein. The application usage information may characterize usage of applications within digital application environments by the users, as described in the co-pending U.S. Application. As used herein, a cluster of users may refer to a set of users that have been congregated together as a result of the psychological parameter values, the application usage information of the users obtained, and/or other information of the individual users without regard to pre-existing clusters. In some implementations, the users may be assigned to the clusters based on the plurality of the performance of the user behavior patterns, and novel or known machine learning techniques. Given the plurality of the performances and the machine learning techniques, the assignments to the clusters may improve over time and may rely less on the stated information from the users.

The psychological parameter values may characterize, by way of non-limiting example, achievement motivation, motivation, personality inventory, cultural values, competitiveness, positive and negative affect before, during, and/or after engagement with the online game (i.e., emotions), communication style, personal values, daily routines/activities, life/gaming pain points, life/gaming hopes and aspirations, wellbeing, user experience, gaming/experience using time, subscription behavior, affinity information, personality, emotional style, goal orientation, goal commitment, ego and task orientation, relatedness, sense of community, social influence, social identity, group identification, we-identity, quality of life, satisfaction with life, work-related quality of life, mindfulness, happiness, emotional intelligence, self-awareness/internal awareness, external awareness, connectedness to nature, social connectedness, social bonding, perceived stress, depression, anxiety, decision-making style, thinking style, critical thinking, cognitive approach to learning, learning style, attributional style, internality-externality, stability-instability, global-specific, creativity, curiosity, playfulness, exploration, mental strength, grit, flourishing, gratitude, inspiration, spirituality, hedonism, materialism/material values, perceptions, sentiments, and/or other psychological parameters.

Achievement motivation may include compensatory effort, competitiveness, confidence in success, dominance, eagerness to learn, engagement, fearlessness, flexibility, flow, goal setting, independence, internality, persistence, preference in difficult tasks, pride in productivity, self-control, status orientation, ambition, self-assurance, and/or other psychological parameters. Motivation may include mastery, purpose, autonomy, and/or other psychological parameters.

Personality inventory may include neuroticism, openness, conscientiousness, extraversion, and agreeableness and/or other psychological parameters. Neuroticism may include anxiety, impulsiveness, vulnerability, and/or other psychological parameters. Openness may include fantasy, feelings/empathy, action, and/or other psychological parameters. Conscientiousness may include achievement striving, competence, self-discipline, and/or other psychological parameters. Extraversion may include warmth assertiveness, activity, and/or other psychological parameters. Agreeableness may include trust, altruism, modesty, and/or other psychological parameters.

Cultural values may include individualism, indulgence, long term orientation, masculinity, power distance, uncertainty avoidance, and/or other psychological parameters. Competitiveness may include avoidant, collaborative, competitive affectivity, dependent, dominant, general competitiveness, independent, personal enhancement, and/or other psychological parameters.

Positive and negative affect before, during, and/or after engaging in the online game may include hostility, joviality, negative emotions, positive emotions, sadness, self-assurance, and/or other psychological parameters. Communication style may include feeler, intuitor, sensor, thinker, and/or other psychological parameters.

Wellbeing may include social wellbeing, psychological wellbeing, physical wellbeing, physical activity, sleep, bounded reciprocity, resilience grit, and/or other psychological parameters.

Personality may include anger, hostility, depression, self-conscientiousness, excitement-seeking, positive emotions, gregariousness, ideas, values, aesthetics, tender-mindedness, straightforwardness, compliance, deliberation, order, dutifulness, and/or other psychological parameters.

Emotional style may include resilience, outlook, social intuition, self-awareness, sensitivity to context, attention, and/or other psychological parameters.

Goal orientation may include mastery approach/learning goal orientation, performance approach/performance goal orientation, performance avoid/avoidance goal orientation, and/or other psychological parameters.

Work-related quality of life may include structure, boundaries, focus, efficiency, information provision, communication, psychological support, stress at/from work, psychological safety, connectedness with team, motivation to work, adaptability, job/career satisfaction, control at work, homework interface, general wellbeing, working conditions, and/or other psychological parameters.

Mindfulness may include observing, describing, acting with awareness, non-judgment, non-reactivity, and/or other psychological parameters.

Emotional intelligence may include emotion perception, emotion expression, emotion management, emotion regulation, impulse control, relationships, stress management, and/or other psychological parameters.

Social connectedness may include social connectedness, loneliness, membership self-esteem, private self-esteem, public self-esteem identity self-esteem, interdependent self, independent self, social avoidance, social distress, and/or other psychological parameters. Decision-making style may include respected, confident, spontaneous, dependent, vigilant, avoidant, brooding, intuitive, anxious, and/or other psychological parameters.

Thinking style may include intuitive, experiential, analytical, rational, and/or other psychological parameters.

Cognitive approaches to learning may include avoidant, participative, competitive, collaborative, dependent, independent, and/or other psychological parameters.

Learning style may include visual (spatial), aural (auditory-musical), verbal (linguistic), physical (kinesthetic), logical (mathematical), social (interpersonal), solitary (intrapersonal), and/or other psychological parameters.

Mental strength may include tenacity, confidence, optimism, adaptability, self-awareness, reliability, responsibility, well-being, and/or other psychological parameters.

Flourishing may include positive emotion, engagement, relationships, meaning, accomplishment, health, loneliness, and/or other psychological parameters.

By way of non-limiting example, the psychological parameter values of the psychological parameters may be a number score on a predetermined range unique to each psychological parameter, a letter score, and/or other type of value than may characterize a particular user as whole.

By way of non-limiting illustration, the user information may include user information for a first user. The user information for the first user may include stated information previously provided by the first user, a first psychological profile of the first user determined based on the stated information, an assignment of the first user to a first cluster based on the first psychological profile, the application usage information for the first user, and/or other information related to the first user. The psychological profiles of the users assigned to the first cluster may indicate strong presentation of a first psychological parameter.

Information component 110 may be configured to obtain performance information. The performance information may characterize performances of the user behavior patterns by the individual users within the online game. The performance information may include counts of the user behavior patterns, time information of the user behavior patterns, occurrence of the user behavior patterns, duration of the user behavior patterns, a time period over which the user behavior patterns occurred (e.g., over one week, over one month, over 100 hours, etc.), and/or other performance information. The time information may include, by way of non-limiting example, time of day of the user behavior patterns, day of the week of the user behavior patterns, date of the user behavior patterns, successiveness of the user behavior patterns, whether it the user behavior patterns are a reaction, and/or other time information. In some implementations, the performance information may be stored to electronic storage 128. In some implementations, the performance information may be obtained from operating systems that aggregate the performance information from the individual applications of client computing platforms 104. In some implementations, the performance information may be obtained from a recordation application installed on client computing platforms 104 that aggregates the performance information from the individual applications and/or other obtainment techniques. In some implementations, the performance information may be obtained and/or determined in the same manner as the application usage information. In some implementations, information component 110 may be configured to store, to electronic storage 128, the information (e.g., user information, the performance information) associated with the individual users. By way of non-limiting example, the individual performances of user behavior patterns may include a first performance of a first pattern by the first user and other users assigned to the first cluster.

Correlation component 112 may be configured to determine correlations between individual ones of the performances of the user behavior patterns and individual ones of the psychological parameters. Determining the correlations may be based on the obtained performance information (e.g., the user behavior patterns, relatively frequent performance of the user behavior patterns), the assignments of the users to the clusters, commonalities in the psychological profiles of the users within the individual clusters, the user information, the application usage information, and/or other information. Commonalities in the psychological profiles of the users may include common psychological parameters with similar and/or closely similar psychological parameters values. In some implementations, the commonalities in the psychological profiles of the users may include commonalities between individual aggregated psychological profiles of individual users and/or commonalities between individual psychological profiles with similar digital application environments (e.g., similar applications or similar application types) of the individual users. In some implementations, the individual psychological profiles with the similar digital application environments may include psychological parameters values determined from other psychological profiles within other digital application environments. The correlations may be determined by Pearson correlation coefficient formula, linear correlation coefficient formula, sample correlation coefficient formula, population correlation coefficient formula, machine learning, and/or other formulas to determine the correlations.

It will be appreciated that the description herein of "correlations" between psychological parameters and user behavior patterns which are positively correlated is not intended to be limiting, and that negative correlations between psychological parameters and user-behavior patterns are also contemplated, and may be included in the generic "correlations". The determination of negative correlations may be made in cases where users assigned to a cluster or clusters strongly presenting a psychological parameter avoid a specific user behavior pattern, and/or where users assigned to a cluster or clusters that do not present the psychological parameter perform the specific user behavior pattern relatively more (e.g., in frequency, total performances, etc.) than users assigned to the cluster or clusters that strongly present the psychological parameter.

As a result, by way of non-limiting illustration, a first correlation may be determined between the first performance of the first behavior pattern and the first psychological parameter. The first correlation may be based on relatively frequent performance of the first performance by the users assigned to the first cluster and the psychological profiles of the users assigned to the first cluster indicating strong presentation of the first psychological parameter. The relatively frequent performance of the first performance by the users assigned to the first cluster may be performed more frequently than other user behavior patterns. In some implementations, the other user behavior patterns may include a second behavior pattern performed by the users assigned to the first cluster (i.e., the same cluster as the first performance). In some implementations, the second behavior pattern may be performed by the users assigned to other ones of the different cluster. As such, the first behavior pattern (or first performance thereof) is performed more frequently than the second behavior pattern.

In some implementations, utilization component 114 may be configured to determine adaptions to the digital application environments for the individual users based on the determined correlations. In some implementations, one or more particular psychological parameter values may be associated with particular adaptations. In some implementations, one or more particular psychological parameter values may be associated with particular user behavior patterns. Such associations may be predefined by system 100, definable by an administrator of system 100, and/or by other definition. By way of non-limiting illustration, a first adaptation to the digital application environments may be made for the first cluster of users, including the first user. In some implementations, the adaptations to the digital application environment may be modifications to user experiences for the users of the individual clusters. The modifications to the user experiences may result in a plurality of variations of the digital application environment. The adaptations may be are designed to enhance prospective usage of the digital application environment by the users, cause less usage of the digital application environment, facilitate usage of particular ones of the applications, facilitate less usage of other particular ones of the applications, and/or other causes.

By way of non-limiting example, the adaptations may include one or more of presenting one or more of the notifications via graphical user interfaces of client computing platforms 104, restricting access to particular ones of the applications indefinitely or for a particular amount of time, restricting access to the digital application environment for a particular amount of time, moving the icons that initiate the applications upon selection on the graphical user interfaces, omitting the icons from application suggestions, terminating particular ones of the applications after a particular amount of time, terminating presentation/access to the digital application environment after a particular amount of time, permitting access to the particular applications after a predetermined amount of time elapses, setting a timer for the amount of time to elapse, modifications to appearance and/or aesthetic of the digital application environment, modifications to appearance and/or aesthetic of the applications, restricting particular features within the applications, permitting particular features within the applications, and/or other adaptations.

The notification may include a recommendation, a suggestion, and/or other notifications. The recommendations may include actions, determined based on their cluster, that the user is advised to do (e.g., recommend the user to use or interact with, or not, specific ones of the applications or applications of a specific application type). The suggestion may include particular ideas, plans, and/or strategies for the application usage by the user to consider executing, following, and/or is determined they will enjoy or to avoid other ideas, plans, content, and/or strategies during application usage.

Adjusting the appearance and/or aesthetic of the digital application environment and/or the applications thereof may adjust a brightness, colors, size, layout, landscape, animations, fonts, font sizes, shapes, user interface elements, and/or other user interface presentations, and/or other appearances of the digital application environment or applications thereof. User interface elements may be configured to facilitate user interaction with a user interface, user entry, and/or selection. By way of non-limiting illustration, the user interface elements may include one or more of text input fields, drop down menus, check boxes, display windows, virtual buttons, and/or other user interface elements.

In some implementations, the adaptations may include adjusting a difficulty setting for and/or game content within the gaming applications, means of communication that facilitate the interactions with other users, an offer to sell one or more virtual items made available, and/or other adaptations.

The adjusted difficulty setting may adjust how challenging one or more aspects of the digital experience are. By way of non-limiting example, adjusting difficulty settings may include adjusting how challenging the digital experience (e.g., online game) as a whole is, how challenging particular tasks are (e.g., building, battling, problem solving, etc.), how challenging it is to complete one or more levels, adjusting how challenging it is to complete a level with every advancement of a level, and/or other difficulty setting adjustments.

The game content may be made available or omitted within the gaming applications. Such game content (or pieces thereof) may include one or more of a player-controlled character, a non-player-controlled character, a task, a quest, an assignment, a mission, a level, a chapter, a mini-game, a virtual item, a virtual resource (e.g., weapon, tool), of in-game powers, in-game skills, in-game technologies, and/or other pieces of game content. By way of non-limiting example, virtual items may include one or more of clothing, pets, transportation units (e.g., aircrafts, motor vehicles, watercrafts, etc.), units, buildings, and/or other virtual items.

Adjusting the means of communication may include adjusting the means of communication made available to be used contemporaneously, made available to be used one at a time, omitted, and/or other adjustments on means of communication. The means of communications may include communication applications. The applications may include the communication applications. For example, the communication applications may be native to operating systems of the client computing platforms 104 or installed. In some implementations, adjusting the means of communication may include adjusting when the interactions are sent, when the interactions are received, to whom the interactions are sent, from whom the interactions are received, and/or other adjustments to the means of communication.

In some implementations, particular applications may not be adapted or may not be affected by the adaptations. For example, the applications may include communication applications that individually or separately enable phone calling, video calling, texting, email, and/or the other means communications by the users with other users (e.g., parents, friends). Some adaptations, such as restricts to access of particular applications or all applications, may not apply to the communication applications, or some but not all the communication applications (e.g., restrict texting applications but not phone calling applications). In some implementations, adaptations to the digital application environments may be made for individual users without the individual users being grouped into a cluster. Thus, such adaptations may be unique to the particular user.

By way of non-limiting illustration, based on the correlations and/or other information related to the individual users, utilization component 114 may determine setting a timer for 2 hours to restrict access to the digital application environment as an adaptation. By way of non-limiting illustration, based on the correlations and/or other information related to the individual users, utilization component 114 may determine restricting access to social networking applications between 5 PM and 7 PM as an adaptation.

Utilization component 114 may be configured to transmit the adaptations to client computing platforms 104 associated with the users for implementation. By way of non-limiting illustration, the first adaption may be transmitted to the client computing platforms 104 associated with the users of the first cluster for implementation. In some implementations, some or all of the adaptations may be implemented immediately. In some implementations, some or all of the adaptations may be implemented during a particular time of day (e.g., during sleep hours of 12 AM-4 AM). In some implementations, some or all of the adaptations may be implemented responsive to user input that approves of the adaptations. In some implementations, upon multiple adaptations being transmitted to client computing platforms 104, some of the multiple adaptations may be approved via the user input and some of the multiple adaptations may be denied via the user input.

In some implementations, the information associated with the individual users (i.e., the user information, the performance information, the application usage information), the correlations, and/or other information may be communicated with client computing platforms 104 associated with the respective users client computing platforms 104 associated with the managing accounts, software developers (e.g., for games, websites, user experiences, etc.), and/or others. Such recipients of the information associated with the individual users may download, export, purchase, subscribe to, obtain in real-time, and/or other obtainments the information associated with the individual users, the correlations, and/or other information.

In some implementations, utilization component 114 may be configured to assign individual unstated users to individual clusters. The assignment may be based on performances of the user behavior patterns by the individual unstated users, the application usage information, the determined correlations, and/or other information. The users exhibiting user behavior patterns within the digital application environment may include the unstated users. The unstated users may have not provided stated information that determines psychological parameter values to the psychological parameters associated with the users. Thus, the unstated users may not have psychological profiles defined by the psychological parameter values. By way of non-limiting illustration, the unstated users may include a second user. The second user may be assigned to the first cluster based on a second performance of a second behavior pattern by the second user and the first correlation.

In some implementations, upon assignment of the individual unstated users to the individual clusters, information component 110 may be configured to obtain the performance information that characterizes performances of user behavior patterns by the individual unstated users, their application usage information, and/or other information. In some implementations, utilization component 114 may be configured to effectuate information component 110 to perform such obtainment upon the assignment of the individual unstated users to the individual clusters. The determining of the correlations (by correlation component 112) may be based on the obtained performances of user behavior patterns by the individual unstated users, their application usage information, and/or other information. In some implementations, the determining of correlations may be based on the obtained performances of user behavior patterns by the individual unstated users and/or the obtained performances of the user behavior patterns by individual users who have provided the stated information including the second performance of the second behavior pattern.

By way of non-limiting illustration, upon assignment of the second user to the first cluster, the second performance may be obtained. The determination of the correlations may be based on the second performance, the first performance, and/or other performances of user behavior patterns by individual users within the various digital application environments.

Figure 3:
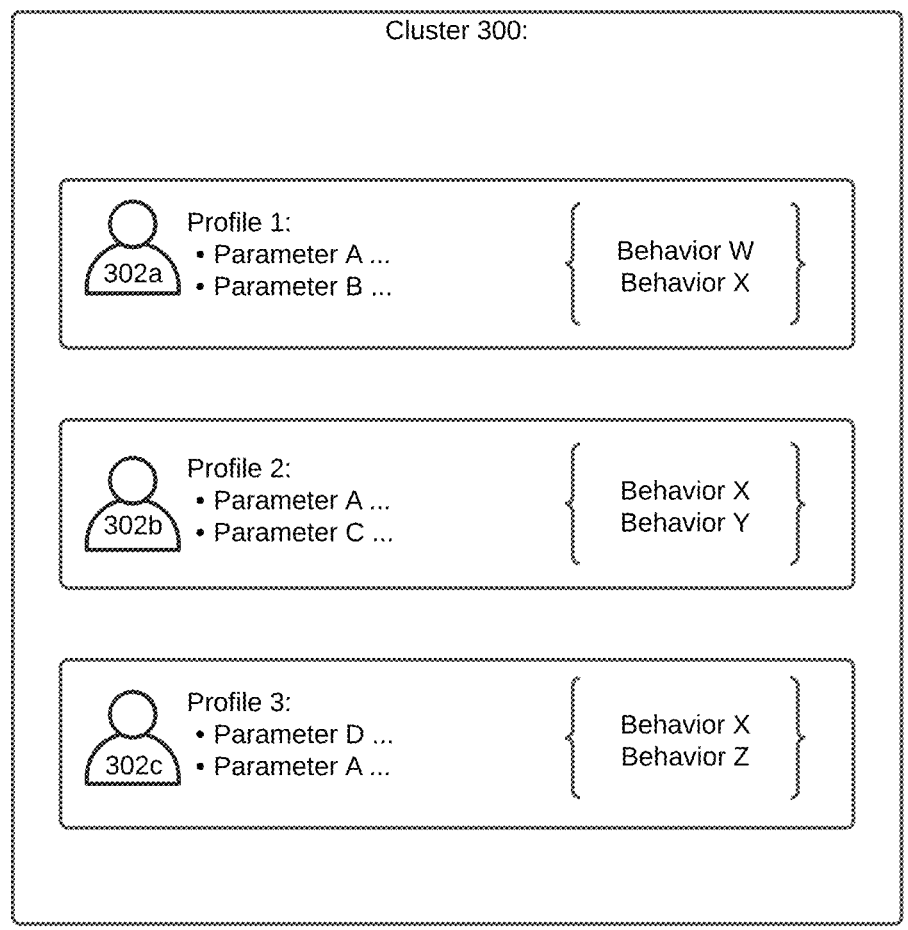
FIG. 3 illustrates an example implementation for correlating user behavior patterns within digital application environments with psychological attributes of users exhibiting the user behavior patterns, in accordance with one or more implementations.
Figure 3:
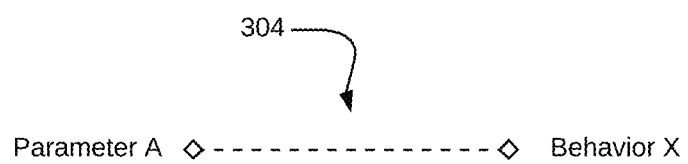
Figure 4:
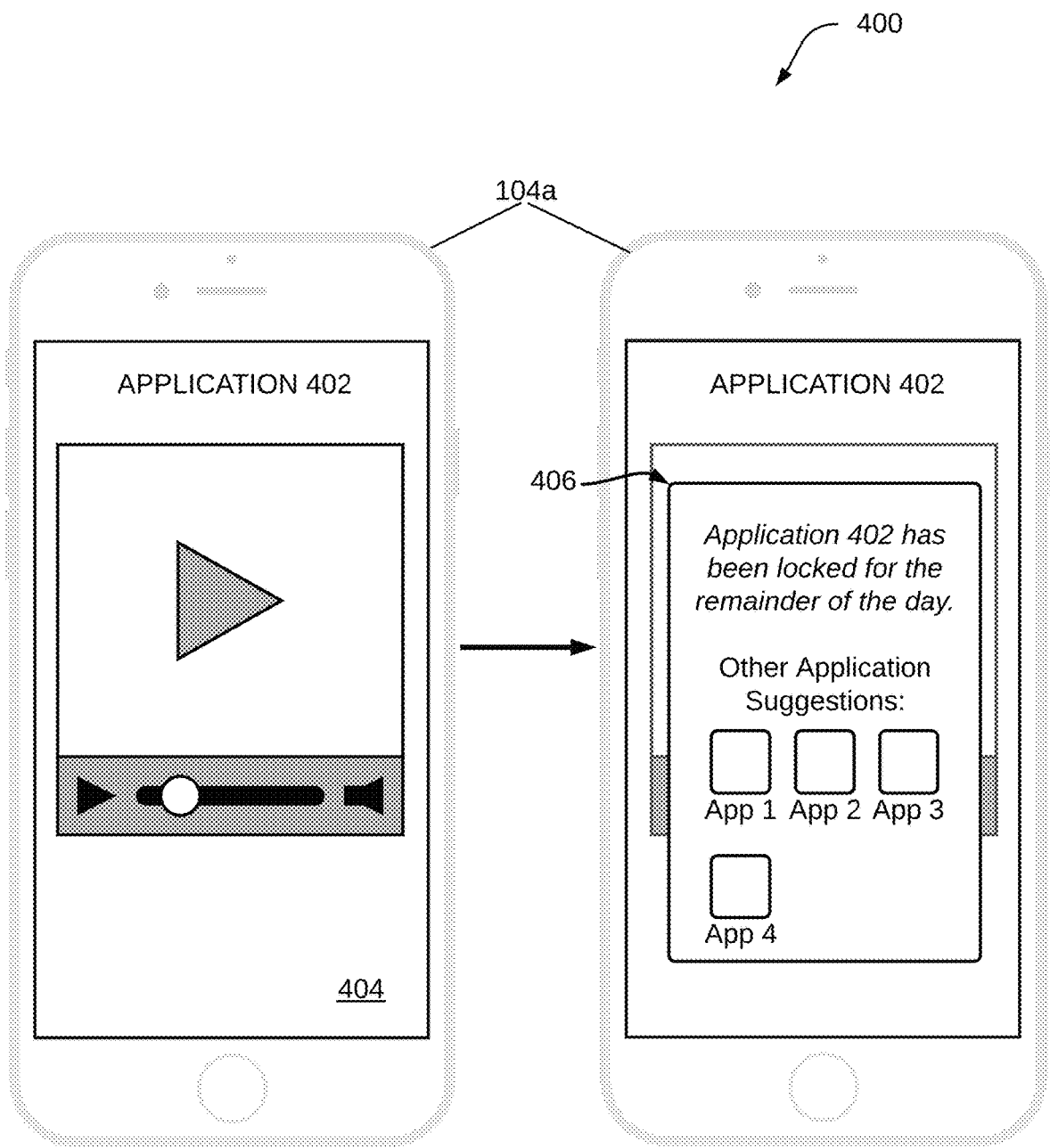
FIG. 4 illustrates an example implementation for correlating user behavior patterns within digital application environments with psychological attributes of users exhibiting the user behavior patterns, in accordance with one or more implementations.

FIG. 3-4 illustrates an example implementation for correlating user behavior patterns within digital application environments with psychological attributes of users exhibiting the user behavior patterns, in accordance with one or more implementations. FIG. 3 illustrates cluster 300. Cluster 300 includes users 302a, 302b, and 302c. Users 302a, 302b, and 302c are associated with psychological profiles (e.g., Profile 1, Profile 2, and Profile 3, respectively) that define psychological parameter values of the users. Users 302a, 302b, and 302c may perform user behavior patterns within digital application environments. For example, user 302a may perform behaviors W and X, user 302b may perform behaviors X and Y, and user 302c may perform behaviors X and Z. Based on the assignments of users 302a, 302b, and 302c to cluster 300, the user behavior patterns, and commonalities in psychological profiles (e.g., Parameter A), a correlation 304 between Parameter A and behavior X may be determined.

FIG. 4 illustrates adaptation implementation 400. Adaptation implementation 400 may be based on correlation 304 of FIG. 3. Client computing platform 104a may be associated with user 302a of FIG. 3. Client computing platform 104a may provide digital application environment 404 for user 302a. Digital application environment 404 may present application 402 that user 302a interacts with (e.g., watching videos). Based on correlation 304, adaptation 406 to digital application environment 404 may be determined and transmitted to client computing platform 104a for implementation, and implemented. Adaptation 406 may be restricting access to a particular application for the rest of the day, i.e., application 402, a notification of the restriction, and suggestions of other applications to interact with (e.g., Apps 1-4).

In some implementations, server(s) 102, client computing platform(s) 104, and/or external resources 126 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 126 may be operatively linked via some other communication media.

A given client computing platform 104 may include one or more processors configured to execute computer program components. The computer program components may be configured to enable an expert or user associated with the given client computing platform 104 to interface with system 100 and/or external resources 126, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 126 may include sources of information outside of system 100, external entities participating with system 100, and/or other resources. In some implementations, some or all of the functionality attributed herein to external resources 126 may be provided by resources included in system 100.

Server(s) 102 may include electronic storage 128, one or more processors 130, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 128 may comprise non-transitory storage media that electronically stores information. The electronic storage media of electronic storage 128 may include one or both of system storage that is provided integrally (i.e., substantially non-removable) with server(s) 102 and/or removable storage that is removably connectable to server(s)

102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, information determined by processor(s) 120, and/or other information that enables server(s) 102 to function as described herein.

Processor(s) 130 may be configured to provide information processing capabilities in server(s) 102. As such, processor(s) 130 may include one or more of a digital processor, an analog processor, a digital circuit designed to process information, an analog circuit designed to process information, a state machine, and/or other mechanisms for electronically processing information. Although processor(s) 130 is shown in FIG. 1 as individual single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 110, 112, and/or 114, and/or other components. Processor(s) 130 may be configured to execute components 110, 112, and/or 114, and/or other components by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 110, 112, and/or 114 are illustrated in FIG. 1 as being implemented within a single processing unit, in implementations in which processor(s) 130 includes multiple processing units, one or more of components 110, 112, and/or 114 may be implemented remotely from the other components. The description of the functionality provided by the different components 110, 112, and/or 114 described below is for illustrative purposes, and is not intended to be limiting, as any of components 110, 112, and/or 114 may provide more or less functionality than is described. For example, one or more of components 110, 112, and/or 114 may be eliminated, and some or all of its functionality may be provided by other ones of components 110, 112, and/or 114. As another example, processor(s) 130 may be configured to execute one or more additional components that may perform some or all of the functionality attributed below to one of components 110, 112, and/or 114.

Processor(s) 120 may include one or more of a digital processor, an analog processor, a digital circuit designed to process information, an analog circuit designed to process information, a state machine, and/or other mechanisms for electronically processing information. Although processor(s) 120 is shown in FIG. 1 as individual single entity, this is for illustrative purposes only. In some implementations, processor(s) 120 may include a plurality of processing units. These processing units may be physically located within the same device, or processor(s) 120 may represent processing functionality of a plurality of devices operating in coordination. Processor(s) 120 may be configured to execute components 108, and/or other components (e.g., components 110, 112, and/or 114). Processor(s) 120 may be configured to execute components 108, and/or other components by software; hardware; firmware; some combination of software, hardware, and/or firmware; and/or other mechanisms for configuring processing capabilities on processor(s) 120.

It should be appreciated that the description of the functionality provided by component 108 described below is for illustrative purposes, and is not intended to be limiting, as component 108 may provide more or less functionality than is described.

In some implementations, some or all of the functionality of one or more of components 108, 110, 112, and/or 114 will be attributed to server(s) 102 can implemented amongst servers or sub servers, and/or variations thereof.

For example, processor(s) 120 may be configured to execute one or more additional components that may perform some or all of the functionality attributed below to one of components 108, 110, 112, and/or 114.

Figure 2:
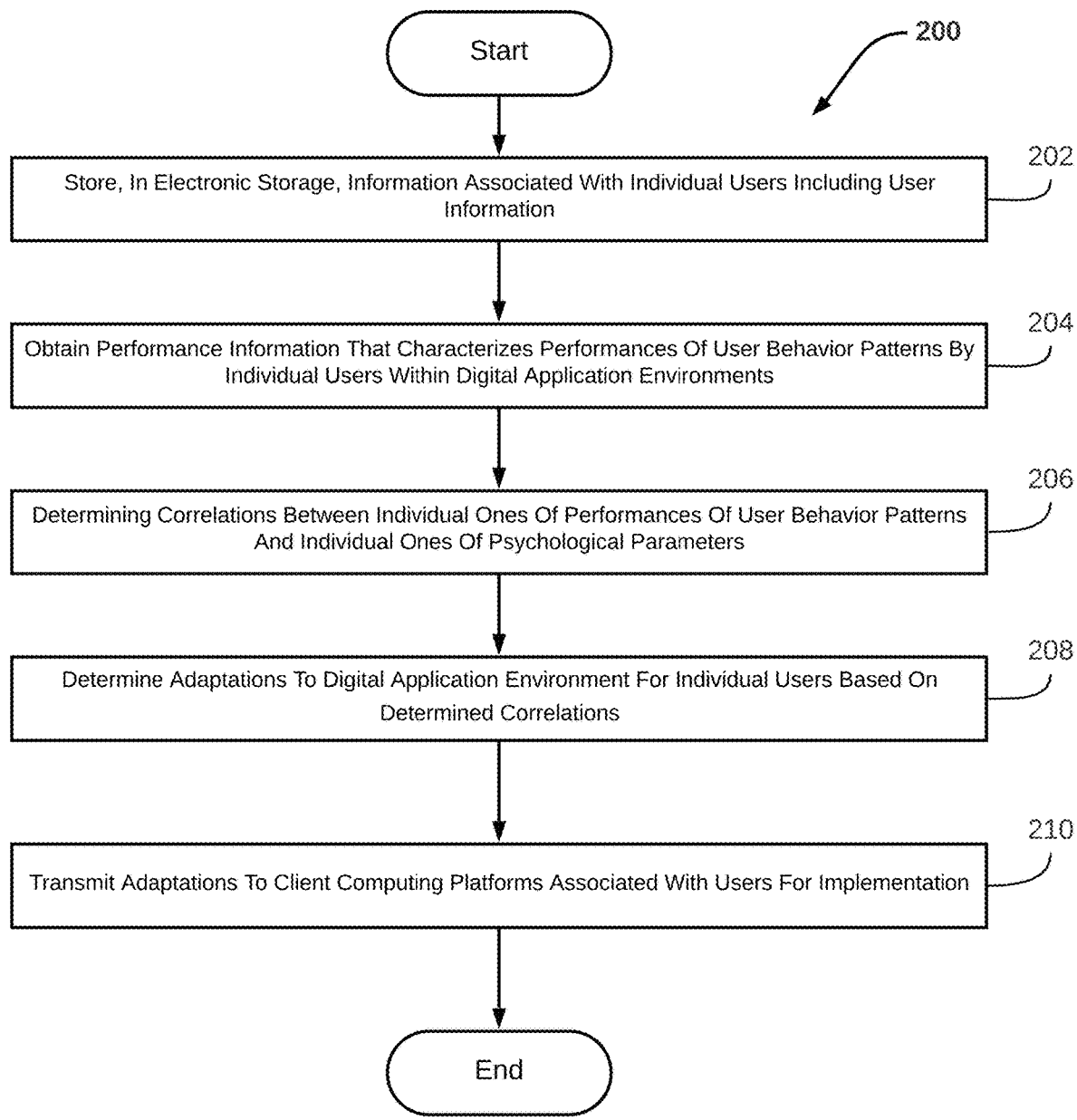
FIG. 2 illustrates a method to correlate user behavior patterns within digital application environments with psychological attributes of users exhibiting the user behavior patterns, in accordance with one or more implementations.

FIG. 2 illustrates a method 200 to correlate user behavior patterns within digital application environments with psychological attributes of users exhibiting the user behavior patterns, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include storing, in electronic storage, information associated with the individual users including the user information. Operation 202 may be performed by one or more hardware processors configured by machine-readable instructions including a component that is the same as or similar to electronic storage 128 and information component 110, in accordance with one or more implementations.

An operation 204 may include obtaining performance information that characterizes performances of user behavior patterns by the individual users within the digital application environments. The client computing platforms may be associated with the users. Operation 204 may be performed by one or more hardware processors configured by machine-readable instructions including a component that is the same as or similar to information component 110, in accordance with one or more implementations.

An operation 206 may include determining correlations between individual ones of the performances of the user behavior patterns and individual ones of the psychological parameters. The determination may be based on the obtained user behavior patterns, the assignments of the users to the clusters, and commonalities in the psychological profiles of the users within the individual clusters. Operation 206 may be performed by one or more hardware processors configured by machine-readable instructions including a component that is the same as or similar to correlation component 112, in accordance with one or more implementations.

An operation 208 may include determining adaptations to the digital application environment for the individual users based on the determined correlations. Operation 208 may be performed by one or more hardware processors configured by machine-readable instructions including a component that is the same as or similar to utilization component 114, in accordance with one or more implementations.

An operation 210 may include transmitting the adaptations to client computing platforms associated with the users for implementation. An operation 210 may be performed by one or more hardware processors configured by machine-readable instructions including a component that is the same as or similar to utilization component 114, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to correlate performances of user behavior patterns within digital application environments with psychological attributes of users exhibiting the user behavior patterns to determine adaptations to the digital application environments, the system comprising:
    electronic storage configured to store user information for individual users, wherein the user information includes psychological profiles for the users and assignments of the users to different clusters of the users, wherein the different clusters are associated with different psychological profiles, wherein a given psychological profile is defined by multiple psychological parameter values to psychological parameters, and the users are assigned to the different clusters based on the psychological parameter values of the individual users, wherein the psychological profiles of the users assigned to the different clusters indicate strong presentations of different psychological parameters; and
    one or more processors configured by machine-readable instructions to:
        obtain performance information from client computing platforms hosting the digital application environments, the performance information characterizing the performances of the user behavior patterns by the users within the digital application environments hosted on the client computing platforms, wherein the user behavior patterns include actions of the users with the digital application environments, with other ones of the users within the digital application environments, and/or with content within the digital application environments, wherein the user behavior patterns are performed successively;
        determine correlations between individual ones of the performances of the user behavior patterns and individual ones of the psychological parameters based on (i) the user behavior patterns, (ii) the assignments of the users to the different clusters, and (iii) commonalities in the psychological profiles of the users within individual clusters, such that the correlations are determined between the individual ones of the performances of the user behavior patterns and the individual ones of the psychological parameters based on relatively frequent performance of the user behavior patterns by the users assigned to the different clusters and the psychological profiles of the users assigned to same ones of the different clusters indicating strong presentations of the psychological parameters;
        determine the adaptations to the digital application environments for the individual users based on the correlations; and
        transmit the adaptations to the client computing platforms associated with the users to cause the adaptations to be implemented in the digital application environments hosted on the client computing platforms.

2. The system of claim 1, wherein the adaptations include one or more of presenting a notification via graphical user interfaces of the client computing platforms, restricting access to particular ones of the digital application environments, moving icons that initiate the digital application environments upon selection on the graphical user interfaces, omitting the icons from application suggestions, terminating particular applications after a particular amount of time, or permitting access to the particular applications after a predetermined amount of time elapses, wherein the notification includes a recommendation and/or a suggestion.

3. The system of claim 1, wherein the one or more processors are further configured to:
    assign individual new users without the psychological profiles to the individual clusters based on performances of the user behavior patterns by the individual new users and the correlations.

4. The system of claim 3, wherein the one or more processors are further configured to:
    upon assignment of the individual new users to the individual clusters, obtain the performance information that characterizes the performances of the user behavior patterns by the individual new users,
    wherein the determining of the correlations is further based on the performances of the user behavior patterns by the individual new users.

5. The system of claim 1, wherein the actions include one or more of an in-application purchase, an in-application sale, installations of applications, purchases of applications, interactions with users, interactions with content, initiations of particular applications, or terminations of the particular applications.

6. The system of claim 1, wherein the relatively frequent performance of the user behavior patterns by the users assigned to the individual clusters are performed more frequently than other ones of the user behavior patterns by the users assigned to the same ones of the different clusters.

7. A method to correlate performances of user behavior patterns within digital application environments with psychological attributes of users exhibiting the user behavior patterns to determine adaptations to the digital application environments, the method comprising:

storing, in electronic storage, user information for individual users, wherein the user information includes psychological profiles for the users and assignments of the users to different clusters of the users, wherein the different clusters are associated with different psychological profiles, where a given psychological profile is defined by multiple psychological parameter values to psychological parameters, and the users are assigned to the different clusters based on the psychological parameter values of the individual users, wherein the psychological profiles of the users assigned to the different clusters indicate strong presentations of different psychological parameters;

obtaining performance information from client computing platforms hosting the digital application environments, the performance information characterizing the performances of the user behavior patterns by the users within the digital application environments hosted on the client computing platforms, wherein the user behavior patterns include actions of the users with the digital application environments, with other ones of the users within the digital application environments, and/or with content within the digital application environments, wherein the user behavior patterns are performed successively;

determining correlations between individual ones of the performances of the user behavior patterns and individual ones of the psychological parameters based on (i) the user behavior patterns, (ii) the assignments of the users to the different clusters, and (iii) commonalities in the psychological profiles of the users within individual clusters, such that the correlations are determined between the individual ones of the performances of the user behavior patterns and the individual ones of the psychological parameters based on relatively frequent performance of the user behavior patterns by the users assigned to the different clusters and the psychological profiles of the users assigned to same ones of the different clusters indicating strong presentations of the psychological parameters;

determining the adaptations to the digital application environments for the individual users based on the correlations; and transmitting the adaptations to the client computing platforms associated with the users to cause the adaptations to be implemented in the digital application environments hosted on the client computing platforms.

8. The method of claim 7, wherein the adaptations include one or more of presenting a notification via graphical user interfaces of the client computing platforms, restricting access to particular ones of the digital application environments, moving icons that initiate the digital application environments upon selection on the graphical user interfaces, omitting the icons from application suggestions, terminating particular applications after a particular amount of time, or permitting access to the particular applications after a predetermined amount of time elapses, wherein the notification includes a recommendation and/or a suggestion.

9. The method of claim 7, further comprising:

assigning individual new users without the psychological profiles to the individual clusters based on performances of the user behavior patterns by the individual new users and the correlations.

10. The method of claim 9, further comprising:

upon assignment of the individual new users to the individual clusters, obtaining the performance information that characterizes the performances of the user behavior patterns by the individual new users, wherein the determining of the correlations is further based on the performances of the user behavior patterns by the individual new users.

11. The method of claim 7, wherein the actions include one or more of an in-application purchase, an in-application sale, installations of applications, purchases of applications, interactions with users, interactions with content, initiations of particular applications, or terminations of the particular applications.

12. The method of claim 7, wherein the relatively frequent performance of the user behavior patterns by the users assigned to the individual clusters are performed more frequently than other ones of the user behavior patterns by the users assigned to the same ones of the different clusters.

* * * * *